(12) United States Patent
Hintermann et al.

(10) Patent No.: US 11,721,881 B2
(45) Date of Patent: *Aug. 8, 2023

(54) HYBRID ANTENNA SYSTEM FOR WEARABLE DEVICES

(71) Applicant: Snap Inc., Santa Monica, CA (US)

(72) Inventors: Mathias Andreas Hintermann, Playa Vista, CA (US); Pat Kusbel, Longmont, CO (US); Douglas Wayne Moskowitz, Marina Del Rey, CA (US); Ugur Olgun, Venice, CA (US); Russell Douglas Patton, Marina Del Rey, CA (US); Patrick Timothy McSweeney Simons, Downey, CA (US); John Bernard Ardisana, II, Torrance, CA (US); Teodor Dabov, Los Angeles, CA (US); Ashutosh Y. Shukla, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/351,704

(22) Filed: Jun. 18, 2021

(65) Prior Publication Data

US 2021/0399405 A1    Dec. 23, 2021

Related U.S. Application Data

(63) Continuation of application No. 16/257,011, filed on Jan. 24, 2019, now Pat. No. 11,063,338.

(Continued)

(51) Int. Cl.
*H01Q 1/22* (2006.01)
*H01Q 1/27* (2006.01)
(Continued)

(52) U.S. Cl.
CPC ............... *H01Q 1/22* (2013.01); *G02C 11/10* (2013.01); *G06F 1/1698* (2013.01); *H01Q 1/273* (2013.01);
(Continued)

(58) Field of Classification Search
None
See application file for complete search history.

(56) References Cited

U.S. PATENT DOCUMENTS

| 5,465,099 A | 11/1995 | Mitsui et al. |
| 5,917,575 A * | 6/1999 | Cunningham ........... G02C 1/08 351/90 |

(Continued)

FOREIGN PATENT DOCUMENTS

| CN | 101465477 | 6/2009 |
| CN | 101965663 | 2/2011 |

(Continued)

OTHER PUBLICATIONS

U.S. Appl. No. 16/256,681 U.S. Pat. No. 10,877,293, filed Jan. 24, 2019, Eyewear Device Lens Retention Mechanism.

(Continued)

*Primary Examiner* — Seokjin Kim
(74) *Attorney, Agent, or Firm* — Schwegman Lundberg & Woessner, P.A.

(57) ABSTRACT

An antenna system comprises a combination of a loop antenna and a non-loop antenna. The loop antenna and the non-loop antenna is connected in common to a transceiver mechanism or signal feed mechanism. The non-loop antenna is in some embodiments provided by a dipole conductor. An eye-wear device incorporates the antenna system, a loop conductor and a dipole conductor of the antenna system being integrated in a body of the eyewear device. The loop conductor may be provided by a lens ring that extends (Continued)

around a lens held by the body. The lens ring may serve both as loop conductor and as a lens retention mechanism.

19 Claims, 8 Drawing Sheets

Related U.S. Application Data

(60) Provisional application No. 62/638,671, filed on Mar. 5, 2018, provisional application No. 62/621,482, filed on Jan. 24, 2018.

(51) Int. Cl.
| | | |
|---|---|---|
| *G02C 11/00* | (2006.01) | |
| *G06F 1/16* | (2006.01) | |
| *H01Q 7/00* | (2006.01) | |
| *H01Q 9/28* | (2006.01) | |
| *H01Q 9/26* | (2006.01) | |
| *H01Q 21/28* | (2006.01) | |

(52) U.S. Cl.
CPC ............... *H01Q 7/00* (2013.01); *H01Q 9/26* (2013.01); *H01Q 9/28* (2013.01); *H01Q 21/28* (2013.01)

(56) References Cited

U.S. PATENT DOCUMENTS

| | | | |
|---|---|---|---|
| 5,980,037 | A | 11/1999 | Conway |
| 8,736,500 | B1 | 5/2014 | Lam |
| 9,482,882 | B1 | 11/2016 | Hanover et al. |
| 9,482,883 | B1 | 11/2016 | Meisenholder |
| 9,726,904 | B1 | 8/2017 | Lin |
| 11,063,338 | B2 * | 7/2021 | Hintermann ............. H01Q 7/00 |
| 2008/0143620 | A1 | 6/2008 | Khatri |
| 2009/0160717 | A1 | 6/2009 | Tsutsumi et al. |
| 2010/0097280 | A1 | 4/2010 | Zirbes et al. |
| 2011/0221656 | A1 | 9/2011 | Haddick et al. |
| 2013/0293354 | A1 | 11/2013 | Vemagiri et al. |
| 2015/0364822 | A1 * | 12/2015 | O'Driscoll ............. H01Q 7/005 |
| | | | 343/718 |
| 2015/0370088 | A1 * | 12/2015 | Damin ..................... G02C 5/10 |
| | | | 351/121 |
| 2016/0078278 | A1 * | 3/2016 | Moore ................. G02B 27/017 |
| | | | 345/8 |
| 2016/0204839 | A1 * | 7/2016 | Liu .......................... H04W 4/02 |
| | | | 345/8 |
| 2019/0229395 | A1 | 7/2019 | Hintermann et al. |
| 2021/0294120 | A1 | 9/2021 | Ardisana, II et al. |

FOREIGN PATENT DOCUMENTS

| | | |
|---|---|---|
| CN | 102484320 | 5/2012 |
| CN | 102498617 | 6/2012 |
| CN | 102916244 | 2/2013 |
| CN | 103081224 | 5/2013 |
| CN | 103858275 | 6/2014 |
| CN | 105449378 | 3/2016 |
| CN | 106486778 | 3/2017 |
| CN | 111656606 | 9/2020 |
| CN | 111656606 | 11/2021 |
| CN | 113922045 A | 1/2022 |
| DE | 20103525 | 3/2003 |
| EP | 2768075 | 8/2014 |
| KR | 101177344 | 8/2012 |
| KR | 102477903 B1 | 12/2022 |
| WO | 2011149364 | 12/2011 |
| WO | 2019147870 | 8/2019 |

OTHER PUBLICATIONS

U.S. Appl. No. 17/113,960, filed Dec. 7, 2020, Eyewear Device Lens Retention Mechanism.
U.S. Appl. No. 16/257,011 U.S. Pat. No. 11,063,338, filed Jan. 24, 2019, Hybrid Antenna System for Wearable Devices.
"International Application Serial No. PCT US2019 015034, International Search Report dated Jul. 18, 2019", 5 pgs.
"International Application Serial No. PCT US2019 015034, Written Opinion dated Jul. 18, 2019", 9 pgs.
"U.S. Appl. No. 16/257,011, Non Final Office Action dated Apr. 15, 2020", 15 pgs.
"U.S. Appl. No. 16/257,011, Response filed Jul. 15, 2020 to Non Final Office Action dated Apr. 15, 2020", 10 pgs.
"U.S. Appl. No. 16/257,011, Final Office Action dated Aug. 7, 2020", 15 pgs.
"International Application Serial No. PCT US2019 015034, International Preliminary Report on Patentability dated Aug. 6, 2020", 11 pgs.
"U.S. Appl. No. 16/256,681, Notice of Allowance dated Aug. 31, 2020", 8 pgs.
"U.S. Appl. No. 16/257,011, Response filed Oct. 7, 2020 to Final Office Action dated Aug. 7, 2020", 10 pgs.
"U.S. Appl. No. 16/257,011, Advisory Action dated Oct. 20, 2020", 3 pgs.
"U.S. Appl. No. 16/257,011, Notice of Allowance dated Dec. 3, 2020", 9 pgs.
"European Application Serial No. 19721408.3, Response filed Jan. 18, 2021 to Communication pursuant to Rules 161(1) and 162 EPC dated Jan. 18, 2021", 45 pgs.
"U.S. Appl. No. 16/257,011, Notice of Allowance dated Mar. 12, 2021", 6 pgs.
"Chinese Application Serial No. 201980009822.7, Office Action dated Jan. 27, 2021", With English translation, 20 pgs.
"U.S. Appl. No. 17/113,960, Preliminary Amendment filed Jun. 16, 2021", 7 pgs.
"Chinese Application Serial No. 201980009822.7, Response filed May 28, 2021 to Office Action dated Jan. 27, 2021", With English claims, 16 pgs.
"Korean Application Serial No. 10-2020-7023867, Notice of Preliminary Rejection dated Nov. 17, 2021", w English translation, 16 pgs.
"European Application Serial No. 19721408.3, Communication Pursuant to Article 94(3) EPC dated Oct. 13, 2022", 7 pgs.
"European Application Serial No. 19721408.3, Response filed Jan. 11, 2023 to Communication Pursuant to Article 94(3) EPC dated Oct. 13, 2022", 39 pgs.
"Korean Application Serial No. 10-2020-7023867, Response filed May 17, 2022 to Office Action dated Nov. 17, 2021", w/ English Claims, 31 pgs.

\* cited by examiner

HYBRID ANTENNA SYSTEM FOR WEARABLE DEVICES

CLAIM OF PRIORITY

This application is a continuation of U.S. patent application Ser. No. 16/257,011, filed Jan. 24, 2019, which claims the benefit of priority to U.S. Provisional Application Ser. No. 62/621,482, filed Jan. 24, 2018 and U.S. Provisional Application Ser. No. 62/638,671, filed Mar. 5, 2018, each of which are hereby incorporated by reference herein in their entireties.

BACKGROUND

Recent trends in consumer electronics have consistently been towards greater miniaturization, while the functionalities of these devices demand increasingly ubiquitous and reliable wireless connectivity. Antenna systems forming part of such electronic devices (for example wearable devices such as smart glasses) often struggle to meet the conflicting requirements for compactness and for reliable transfer of large amounts of data (e.g., video content captured by a pair of smart glasses). These difficulties are exacerbated in wearable devices, where battery power is often at a minimum.

BRIEF DESCRIPTION OF THE DRAWINGS

The appended drawings merely illustrate merely a selection of example embodiments of the present disclosure and cannot be considered as limiting its scope. To facilitate collation of numbered items in the description to the drawings, the first digit of each numbered item corresponds to the figure in which that item first appears. In the drawings.

Figure 1:
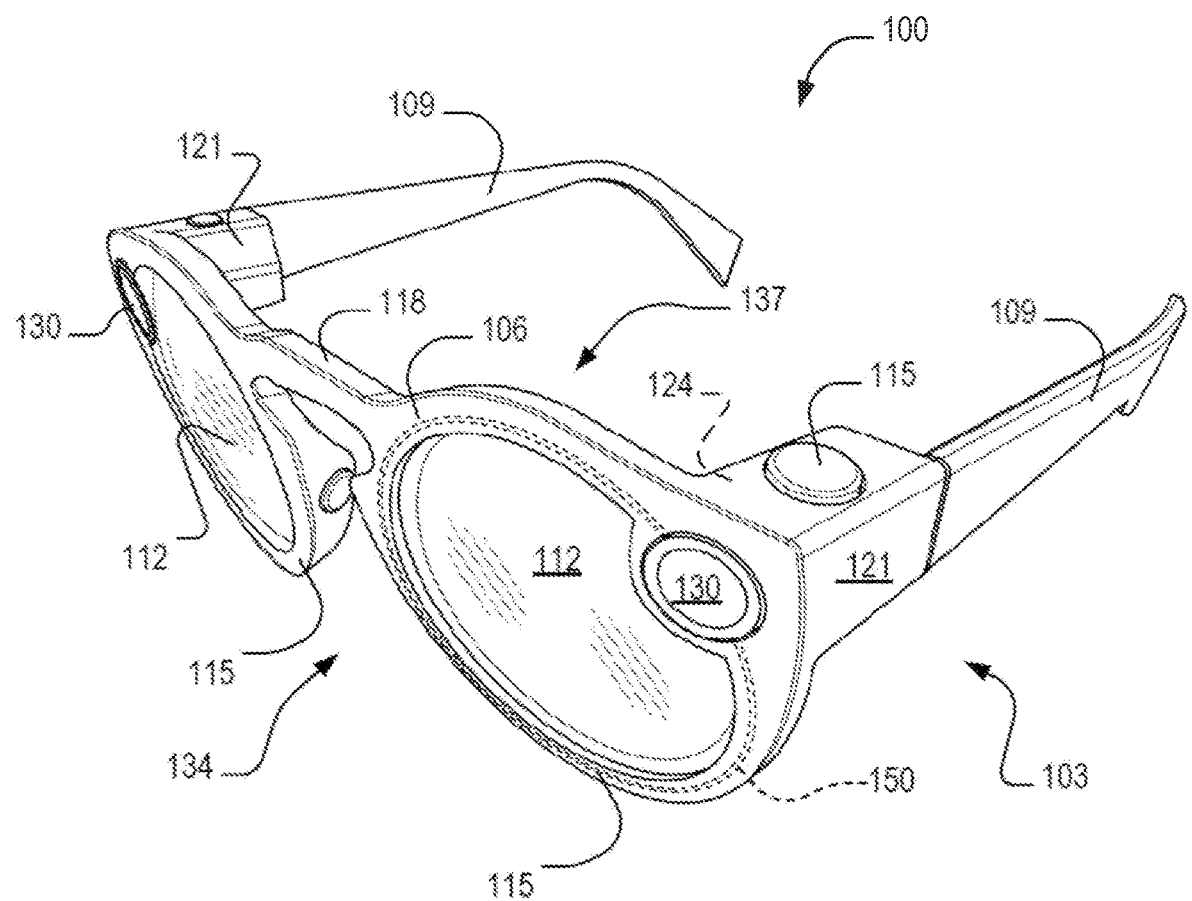
FIG. 1 is a schematic three-dimensional view of an electronics-enabled eyewear device, according to an example embodiment.

The headings provided herein are merely for convenience and do not necessarily affect the scope or meaning of the terms used.

DETAILED DESCRIPTION

One aspect of the disclosure provides for an antenna system that comprises a combination of a loop antenna and a non-loop antenna e.g, a monopole or a dipole antenna), with the loop antenna and the non-loop antenna being connected in common to a common transceiver mechanism or signal feed mechanism. The non-loop antenna and the loop antenna are in some embodiments connected to antenna electronics at a single, common signal feed point.

The loop antenna comprises a loop-shaped electrical conductor, and the non-loop antenna is in some embodiments provided by a dipole conductor, the dipole conductor being separated into two arms at a signal feed point. In some embodiments, the dipole conductor is shaped such as to be offset-fed, with one of the conductor arms being substantially longer than the other. As used herein, the term non-loop conductor/antenna refers to the group consisting of dipole conductors/antennas and monopole conductor/antennas, and excludes loop antenna/conductors. Further, the disclosed antenna elements provided by the respective loop and non-loop conductors are to be understood as providing actively driven antenna elements, which are to distinguished from passive groundplane elements such as that which is in some cases provided by printed circuit board (PCB) groundplanes or extensions thereof.

The antenna system may further include electronics configured to provide frequency-domain discrimination between signals received via the loop antenna and the dipole antenna respectively. In some embodiments, a diplexer may be incorporated in the transceiver system for this purpose, with the loop antenna being sized and shaped for operation as a relatively low-frequency antenna (e.g., serving as a global positioning system (GPS) antenna, and the dipole antenna being configured for operation as a relatively high-frequency antenna (e.g., serving as a data channel operating at, for example, a Wi-Fi frequency of about 2 GHz).

It will be understood that this aspect of the disclosure provides an antenna system that displays improve bandwidth, radiation efficiency, and polarization diversity, when compared to existing antenna systems.

Another aspect of the disclosure provides for an electronics-enabled device having incorporated therein a hybrid antenna system as disclosed herein. In some embodiments, the device is an electronics-enabled eyewear device. In some embodiments, the loop conductor and the dipole conductor of the antenna system are incorporated and housed by an eyewear body configured to hold one or more optical elements within a field of view of the user, when the device is worn.

In some embodiments, the loop conductor may extend circumferentially around one of a pair of lenses (or, in some embodiments, other optical elements such as virtual reality or augmented reality display elements) held by the eyewear device. In some embodiments, the loop conductor may be configured to serve as a lens retainer, engaging a radially outer periphery of the associated lens to keep the lens in position on the eyewear body.

In some embodiments, the dipole conductor includes a loop portion that extends circumferentially around a remaining one of a pair of lenses held by the eyewear device. In some such embodiments, the loop portion of the dipole conductor may serve as a lens retainer. Thus, some embodiments of the disclosure provides for an eyewear device in which both of a pair of lenses mounted on an eyewear body are retained in position by engagement with a respective lens retainer that forms part of the antenna system, with one of the lens retainers being provided by the loop conductor and the other lens retainer being provided by the loop portion of the dipole conductor.

Note that a lens retainer in these cases are provided not merely by a lens rim or holder, but comprise a metal ring element that is selectively disposable between (a) a locked condition in which the lens retainer engages the periphery of the lens to hold it in position, and (b) a released condition in which removal and replacement of the lens is allowed. Some examples of such lens retainers that additionally provide signal transceiving functionality is described in U.S. Patent Application 62/621,482 filed on January 2018, 2018, the contents of which are incorporated herein in their entirety.

In some embodiments, the dipole conductor defines at least one end portion that is oriented transversely to a plane in which the loop conductor lies. In some embodiments in which the antenna system is incorporated in an eyewear device, each of a pair of temples of the eyewear device may house a respective angled end portion of the dipole conductor, with each end portion extending along the corresponding temple in a direction substantially orthogonal to the plane of the loop conductor that circumscribes one of the lenses of the eyewear device.

Note that although the disclosure herein of a device that incorporates a hybrid antenna system, as disclosed, is directed primarily to the example embodiment of an eyewear device, antenna systems as disclosed may in other embodiments be incorporated in different types of electronic devices. Thus, for example, the disclosed antenna system can be profitably employed in other wearable electronic devices, mobile electronic devices (such as mobile phones, tablets, or the like), and/or larger products such as motor vehicles or the like.

The foregoing brief overview of the disclosure will now be explained in greater detail with reference, first, to a brief review of the relevant technical background, and thereafter with reference to a series of specific example embodiments in which different embodiments of the antenna system is incorporated in an eyewear device.

Efficient and broadband antenna radiation is desirable for any wireless communication application. A highly efficient radiator allows significantly enhanced communication range and reduces overall energy consumption. A broadband antenna enables data transmission over multiple frequencies, which in turn enables increased data throughput. In many new consumer devices, however, antenna design is compromised in favor of fashion and style. Industrial design trends in consumer electronics have shifted away from plastic housings towards metal as the material of choice and long plastic breaks on the metal for antenna gaps are no longer acceptable.

Such increasingly prevalent consideration of antennas as an integral component for industrial design and aesthetic design aspects place increased demand on antenna engineering, which aims to avoid poor efficiency and complicated radiofrequency (RF) front ends to meet radiation specifications. Frequently, descendants of one of two fundamental antenna types are employed in consumer electronic devices, namely loop antennas and non-loop (dipole/monopole) antennas, Generally, non-loop antennas comprise a linear (hut not necessarily rectilinear) non-loop conductor. For monopole antennas, a signal feed point is connected to the non-loop conductor at an end of the conductor, while the signal feed point in a dipole antenna separates a dipole conductor in two linear arms. In contrast, a loop antenna comprises a loop-shaped conductor whose ends are connected to a signal feed point or transmission line.

It is important to note that dipole antennas are also referred to as "electric type" antennas, since their main radiating mode is $TM_{10}$. With this is meant that the antenna generates electric fields that are orthogonal to the direction of propagation. Similarly, loop antennas are called "magnetic type" antennas, since their main radiating mode as $TE_{10}$, with which is meant that the antenna generates magnetic fields that are orthogonal to the direction of propagation.

The description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

Various embodiments of an antenna system according to this disclosure will be described below with reference to an electronic device in the example form of an eyewear device that incorporates the disclosed antenna system. An example embodiment of such an eyewear device in which different embodiments of the antenna system can be incorporated will first be described with reference to FIG. 1, after which a series of different example embodiments of antenna systems and eyewear devices incorporating the different respective embodiments will be described with reference to FIGS. 2A-7.

FIG. 1 shows an oblique front view of an electronic device in the example form of an electronics-enabled eyewear device 100, also referred to as a pair of smart glasses. The eyewear device 100 includes a body 103 comprising a front piece or frame 106 and a pair of temples 109 connected to the frame 106 for supporting the frame 106 in position on a user's face when the eyewear device 100 is worn. The frame 106 can be made from any suitable material such as plastics or metal, including any suitable shape memory alloy.

The eyewear device 100 has a pair of optical elements in the example form of a pair of optical lenses 112 held by corresponding optical element holders or lens holders in the form of a pair of lens rims 115 forming part of the frame 106. The rims 115 are connected by a bridge 118. In other embodiments, of one or both of the optical elements can be a display, a display assembly, or a lens and display combination. The eyewear device 100 can, in such embodiments, provide a virtual reality headset or an augmented reality display. Description in this example embodiment of elements relating to lens retention is thus to be read as, in other embodiments, being analogously applicable to different forms of optical elements that can be removably and replaceably received in the lens rims 115 by operation of a retention mechanism analogous to that described herein.

The frame 106 includes a pair of end pieces 121 defining lateral end portions of the frame 106, In this example, a variety of electronics components are housed in one or both of the end pieces 121, as discussed in more detail below. In some embodiments, the frame 106 is formed of a single piece of material, so as to have a unitary or monolithic construction.

The temples 109 are coupled to the respective end pieces 121. In this example, the temples 109 are coupled to the frame 106 by respective hinges so as to be hingedly movable between a wearable mode (as shown in FIG. 1) and a collapsed mode in which the temples 109 are pivoted towards the frame 106 to lie substantially flat against it. In other embodiments, the temples 109 can be coupled to the frame 106 by any suitable means, Each of the temples 109 includes a front portion that is coupled to the frame 106 and a suitable rear portion for coupling to the ear of the user, such as the curved earpiece illustrated in the example embodiment of FIG. 1.

In this description, directional terms such as front, back, forwards, rearwards, outwards and inwards are to be understood with reference to a direction of view of a user when the eyewear device 100 is worn. Thus, the frame 106 has an outwardly directed front side 134 facing away from the user when worn, and an opposite inwardly directed rear side 137 side facing towards the user when the eyewear device 100 is worn. Similarly, the terms horizontal and vertical as used in this description with reference to different features of the eyewear device 100 are to be understood as corresponding to the orientation of the eyewear device 100 when it is level on the face of a user looking forwards. A horizontal or lateral direction of the eyewear device 100 thus extends more or less between the end pieces 121, while a vertical or upright direction of the eyewear device 100 extends transversely to the horizontal direction, such that the lenses 112 can be said to have a more or less vertical or upright orientation.

The eyewear device 100 has onboard electronics 124 including a computing device, such as a computer, which can, in different embodiments, be of any suitable type so as to be carried by the body 103. In some embodiments, various components comprising the onboard electronics 124 are at least partially housed in one or both of the temples 109. In the present embodiment, various components of the onboard electronics 124 are housed in the lateral end pieces 121 of the frame 106. The onboard electronics 124 includes one or more processors with memory, wireless communication circuitry, and a power source (this example embodiment being a rechargeable battery, e.g. a lithium-ion battery). The onboard electronics 124 comprises low-power, high-speed circuitry, and, in some embodiments, a display processor. Various embodiments may include these elements in different configurations or integrated together in different ways. At least some of electronics components of the antenna systems described herein may be housed one or both of the end pieces 121. Thus, for example, a diplexer, GPS receiver, and WLAN transceiver (as described with reference to FIG. 7) may in some embodiments be housed in one of the end pieces 121.

As mentioned, the onboard electronics 124 includes a rechargeable battery. In some embodiments, the battery is disposed in one of the temples 109. In this example embodiment, however, the battery is housed in one of the end pieces 121, being electrically coupled to the remainder of the onboard electronics 124.

The eyewear device 100 is camera-enabled, in this example comprising a camera 130 mounted in one of the end pieces 121 and facing forwards so as to be aligned more or less with the direction of view of a wearer of the eyewear device 100. The camera 130 is configured to capture digital still as well as digital video content. Operation of the camera 130 is controlled by a camera controller provided by the onboard electronics 124, image data representative of images or video captured by the camera 130 being temporarily stored on a memory forming part of the onboard electronics 124. In some embodiments, the eyewear device 100 can have a pair of cameras 130, e.g. housed by the respective end pieces 121.

The eyewear device 100 further includes one or more input and output devices permitting communication with and control of the camera 130. In particular, the eyewear device 100 includes one or more input mechanisms for enabling user control of one or more functions of the eyewear device 100. In this embodiment, the input mechanism comprises a button 115 mounted on the frame 106 so as to be accessible on top of one of the end pieces 121 for pressing by the user.

The eyewear device 100 is, in this example embodiment, configured for wireless communication with external electronic components or devices, to which end the onboard electronics 124 is connected to an antenna system integrated in the body 103 of the eyewear device 100. In some example embodiments, a loop conductor forming part of the antenna system is provided by a lens retainer in the example form of a lens ring 150 that additionally serves the purpose of removably and replaceably retaining the lens 112 in the corresponding lens rim 115. Note that, in FIG. 1, only one of the lens rims 115 is shown as having a corresponding lens ring 150 housed therein, but that both of the lens rims 115 is, in this example embodiment, provided with a respective lens ring 150 and associated lens retention mechanism.

In this example embodiment, the lens ring 150 is located in a circumferentially extending channel in a radially inner surface of the lens rim 115, so that the lens ring 150 extends circumferentially around the majority of the periphery of the lens 112, being engageable with the radially outer edge of the lens 112 to retain the lens 112 in the lens ring 150. The lens ring 150 is disposable between a retention condition, in which it is tightened into contact with the radial edge of the lens 112 to keep it in the lens rim 115, and a replacement condition in which the lens ring is somewhat dilated, to allow removal and replacement of the lens 112.

Figure 2A:
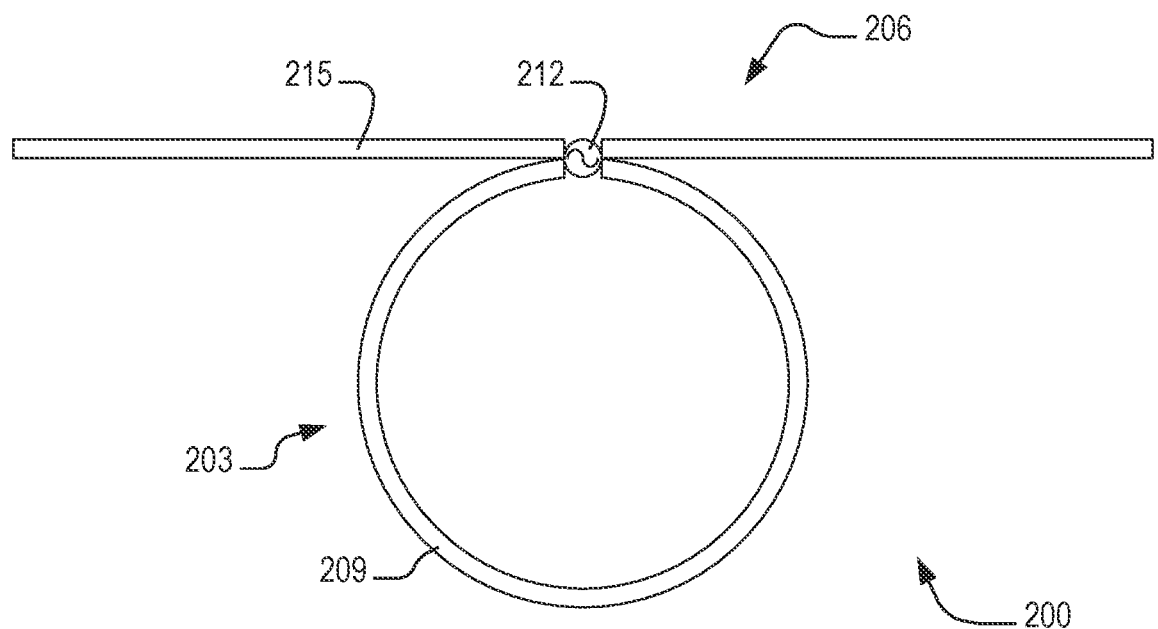
FIG. 2A is a schematic diagram of a loop-dipole hybrid antenna system, in which a dipole component of the antenna system is center-fed, according to an example embodiment.

Turning now to FIG. 2A, therein is shown a schematic, idealized diagram of a dipole-loop hybrid antenna system 200 according to one embodiment of the disclosure. The antenna system 200 of FIG. 2A combines two fundamental antenna types, namely a loop antenna 203 and a dipole antenna 206. This provides a structure in which efficient radiation supported by the $TM_{10}$ and $TE_{10}$ modes is possible. The antenna system 200 of FIG. 2A is essentially a superposition of a loop and dipole antenna 203, 206, in which their radiation patterns are orthogonal to each other, and in which the loop and dipole antennas 203, 206 radiate with different polarizations.

Note that the loop antenna 203 is provided by a loop electrical conductor 209 connected at its adjacent opposite ends to a transmission line or feed point 212 212; while the dipole antenna 215 is provided by a center-fed dipole conductor 215 having two arms of substantially equal length, with adjacent ends of the dipole arms being connected to the feed point 212. Note that the dipole conductor 215 and the loop conductor 209 are connected to a transceiver system at the single, common feed point 212. Note also that the dipole conductor 215 extends substantially tangentially relative to the loop conductor 209 at the feed point 212.

Figure 2B:
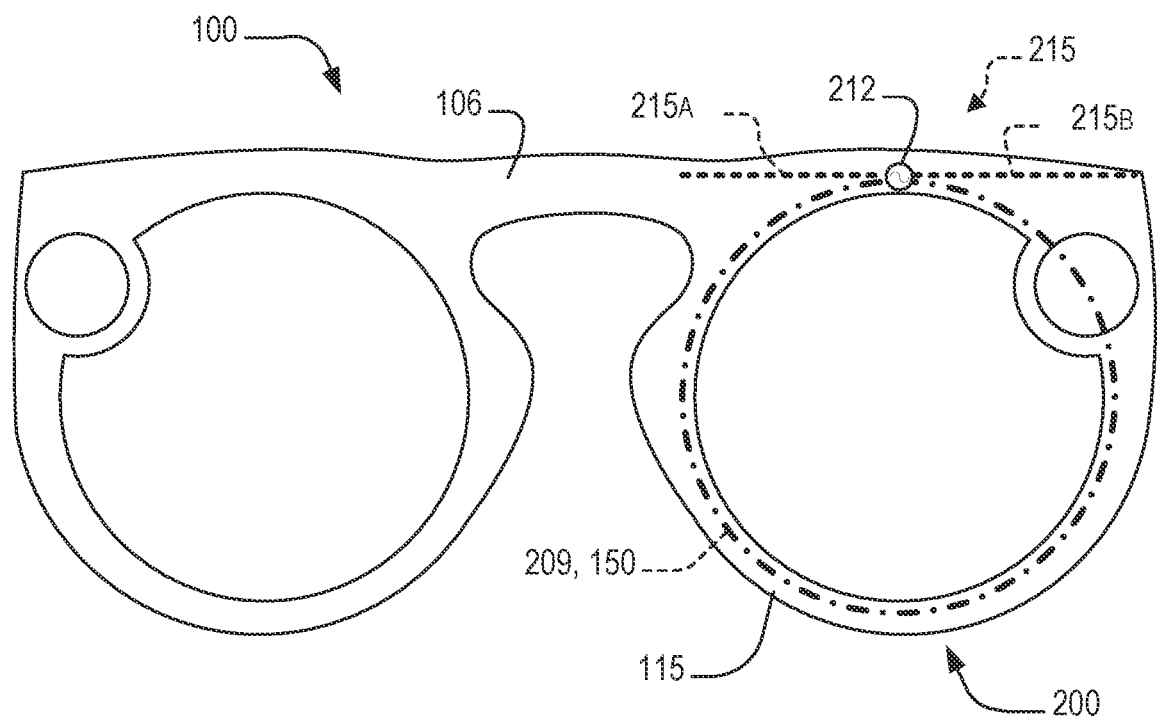
FIG. 2B is a schematic front view of an eyewear device incorporating an antenna system according to the example embodiment of FIG. 2A.

FIG. 2B shows an example embodiment of an eyewear device 100 such as that of the FIG. 1, being provided with an antenna system 200 consistent with the example embodiment of FIG. 2A. In this example embodiment, the loop conductor 209 (shown in FIG. 2A and in subsequent analogous views by a chain-dotted line) extends circumferentially around one of the lenses 112, being at least partially housed by the corresponding lens rim 115. In particular, the loop conductor 209 is in the example embodiment of FIG. 2A provided by the corresponding lens ring 150.

The non-loop conductor provided in this example by the dipole conductor 209 (shown in FIG. 2A and in subsequent analogous views by a dotted line) is in this example embodiment provided by two wire pieces embedded in a molded plastics material of the eyewear frame 106, providing respective arms of the dipole conductor 215 (indicated respectively as 215a and 215b). Note that the representation of FIG. 2B is schematic, and that the shape and size of the dipole arms 215a, 215b can in some embodiments differ substantially from that shown in FIG. 2B. In some embodiments, the dipole conductor arms 215a, 215b can be significantly shorter than that shown in FIG. 2B. Note also that the dipole conductor arms 215a, 215b need not be rectilinear as illustrated in FIG. 2B, and can in some embodiments be curved to follow the shape or contours of the eyewear frame 106.

Note also that the position of the feed point 212 common to the loop conductor 209 and the dipole conductor 215 may be different in different embodiments. In some embodiments, for example, the feed point 212 may coincide more or less with the location of the frame end piece 121, e.g., to either side of the camera lens opening. In such cases, at least one arm of the dipole conductor 215 may extend along a part of the corresponding lens rim 115.

As mentioned, the dipole conductor 215 is in this example embodiment provided by wires (e.g., copper wires) embedded in a molded polymeric plastics material of the eyewear frame 106. In some embodiments, each element of the dipole conductor 215 is provided by a core wire that serves to provide structural integrity or rigidity to the frame 106 (or in embodiments such as that described later herein with reference to FIG. 6B, to the respective temples 109). In other embodiments, the respective arms of the dipole conductor 215 can be provided by structural metal frame components, e.g. in cases where the frame 106 is a metal construction. Instead, or in addition, the dipole conductor 215 may at least in part be provided by metal trim elements or exposed metal parts that serve both aesthetic and signal reception functions. These considerations apply for all of the example embodiments that follow.

With appropriately chosen loop and dipole lengths, the example embodiment of FIGS. 2A and 2B is capable of synchronously supporting the two fundamental modes that have been mentioned previously. In particular, it will be seen that the shapes and relative spatial arrangement of the loop conductor 209 and the non-loop conductor 215 is such that the radiation pattern of the loop conductor 209 is substantially orthogonal to the radiation pattern on the non-loop conductor 215. Moreover, the shape and spatial arrangement of the hybrid antenna components are such that the loop conductor 209 and the non-loop conductor 215 radiate with different respective polarizations, when driven by the signal feed point 212.

Figure 3A:
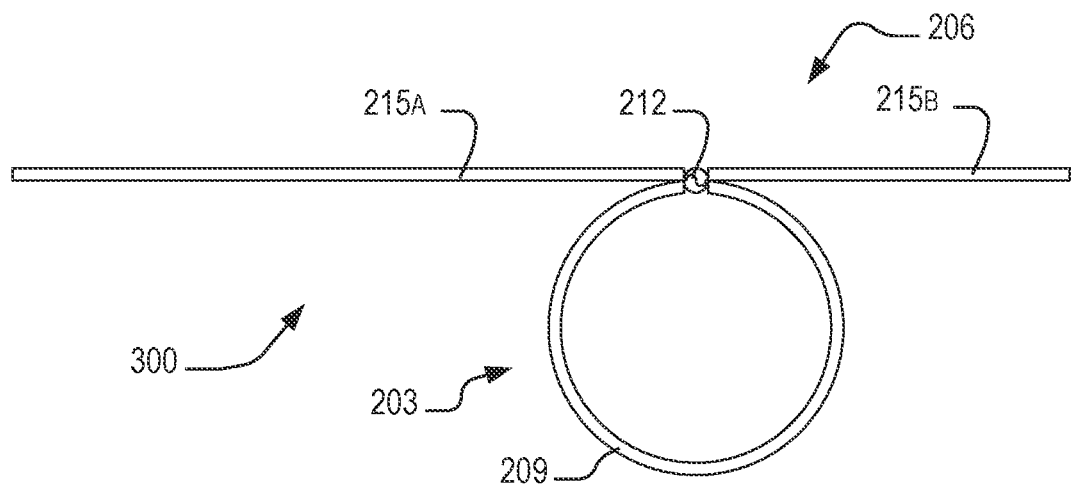
FIG. 3A is a schematic diagram of a loop-dipole hybrid antenna system, in which a dipole component of the antenna system is offset-fed, according to an example embodiment
Figure 3B:
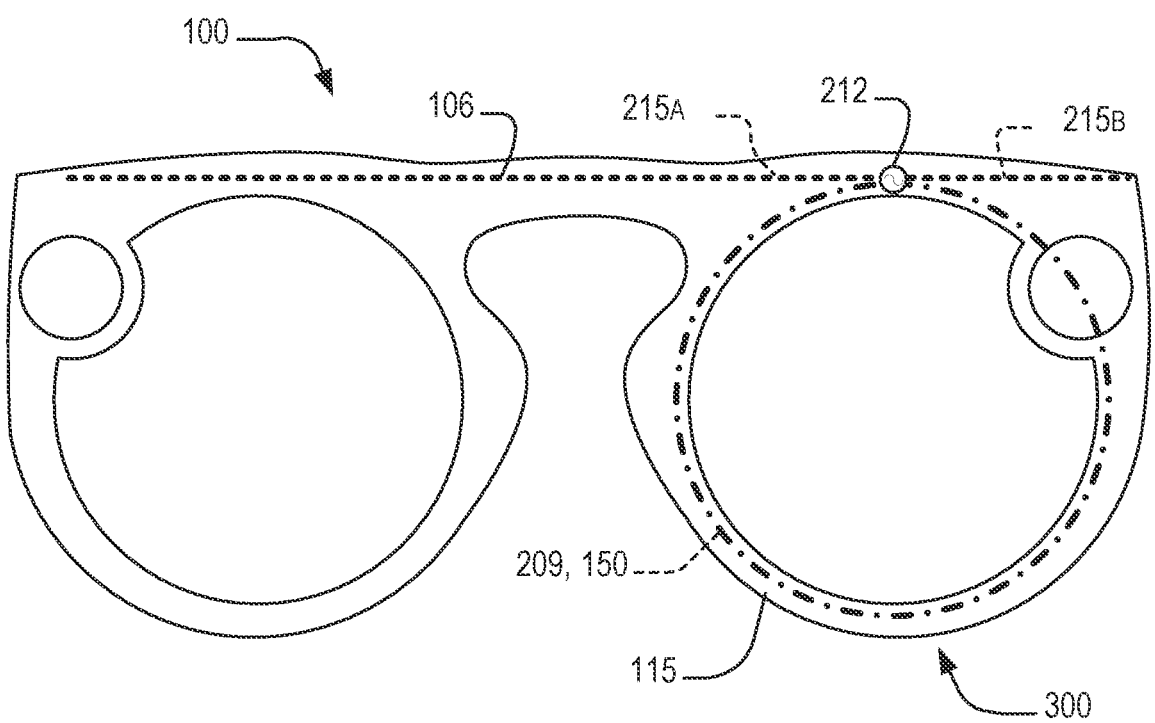
FIG. 3B is a schematic front view of an eyewear device incorporating the antenna system according to the example embodiment of FIG. 3A.

Although the dipole conductor 215 of FIGS. 2A and 2B is center-fed, some embodiments may employ a dipole that is offset-fed. An example of such an embodiment will be described with reference to FIGS. 3A and 3B. FIG. 3A shows a schematic diagram of a dipole-loop hybrid antenna system 300 in which the dipole antenna 206 is offset-fed, while FIG. 3B shows a schematic view of such an offset-fed hybrid antenna system 300 incorporated in an eyewear device 100 as described previously. In the example embodiment of FIG. 3, the loop antenna 203 can be substantially the same as that in FIG. 2, without significant change in performance.

Note that the offset antenna feed for the dipole conductor 215 will not impact the fundamental mode of the dipole antenna 206, since that parameter is determined by the antenna length. The antenna impedance, however, might be impacted when it is offset-fed, as it will move the antenna feed towards the higher voltage area. This means that a higher impedance is seen at the feed point 212 for the fundamental mode, compared to the center-fed design of FIG. 2. However, it is feasible to tune the dipole antenna 206 part of the hybrid antenna with simple lumped components like a capacitor and an inductor. The antenna system of FIG. 3B is tuned in this manner with such lumped components.

Figure 4A:
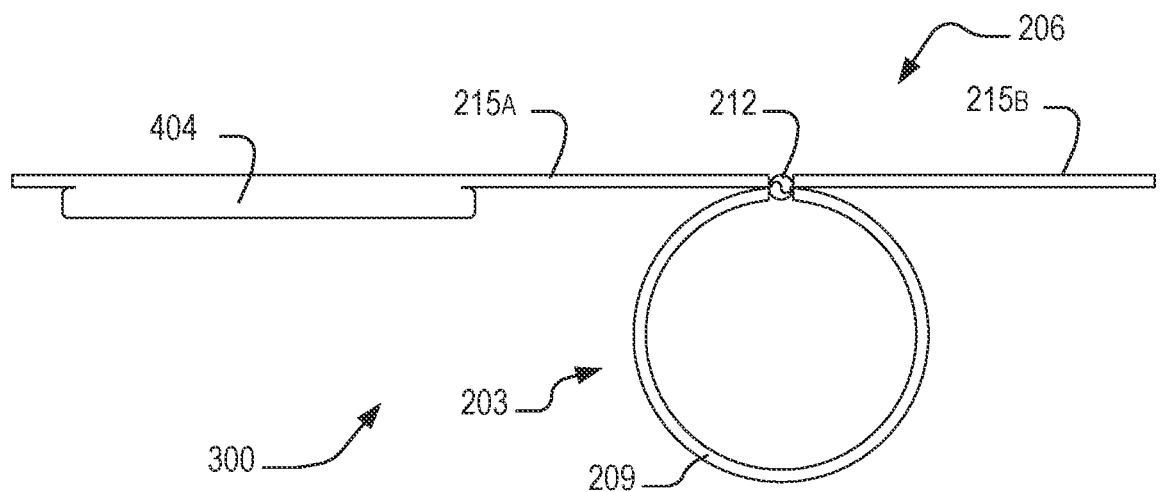
FIG. 4A is a schematic diagram of a loop-dipole hybrid antenna system analogous to that of FIG. 3A, in which a longer arm of a dipole conductor of the antenna system includes a fattened portion, according to one example embodiment.
Figure 4B:
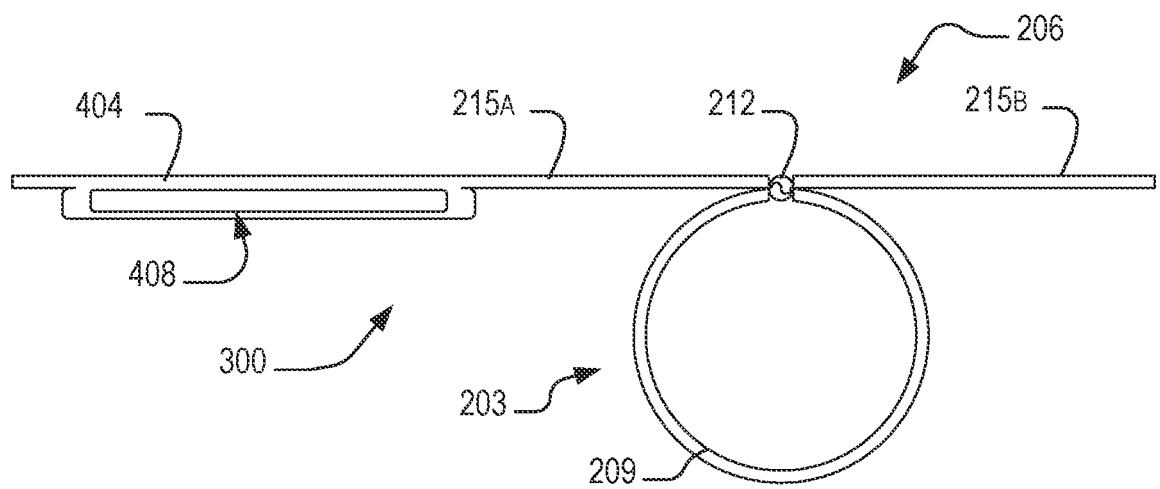
FIG. 4B is a schematic diagram of an antenna system analogous to that of FIG. 4A, in which the fattened portion of the dipole conductor is hollowed out, having a central cut-out opening, according to an example embodiment.

In other embodiments, tuning or balancing of the offset-fed dipole 203 can be achieved by modification of the shape and size of one or more of the arms 215a, 125b of the dipole conductor 215. One known method to reduce the impedance and increase the bandwidth of a dipole in a $TM_{10}$ mode is to increase the width of its radiating arms. FIG. 4A shows an embodiment in which the longer arm 215a of the dipole conductor 215 has a fattened portion 404 in which the width of the dipole conductor 215 is increased. The hybrid antenna system 300 of FIG. 4A can be an efficient radiator. Structural constraints in an electronic device in which the antenna system 300 is to be incorporated can, however, frustrate selection of efficient radiator shape and dimension for the long arm 215a of the dipole conductor 215. Note, however, that fat dipoles accommodate the strongest radiating currents on the outer perimeter of the metal. This phenomenon in essence allows for hollowing out the metal on the fat dipole arm 215a, as shown in FIG. 4B, without losing significant performance gains. In this example embodiment, hollowing out of the fat dipole arm 215 is achieved by providing it with a substantially central cut-out opening 408 in the fattened portion 404.

Figure 5A:
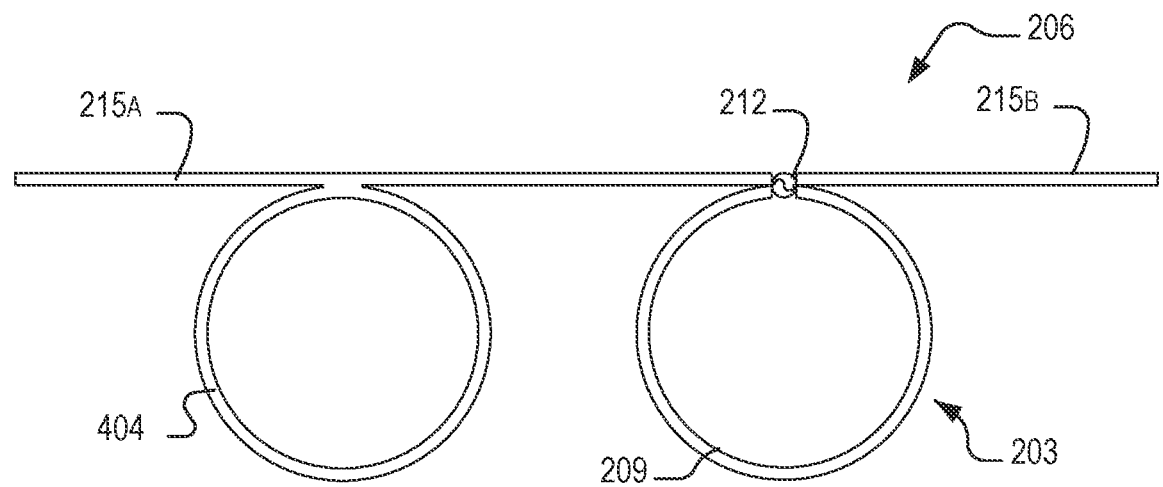
FIG. 5A is a schematic diagram of loop-dipole hybrid antenna system analogous to that of FIG. 4B, but in which the longer arm of the dipole conductor defines a loop portion, according to an example embodiment.
Figure 5B:
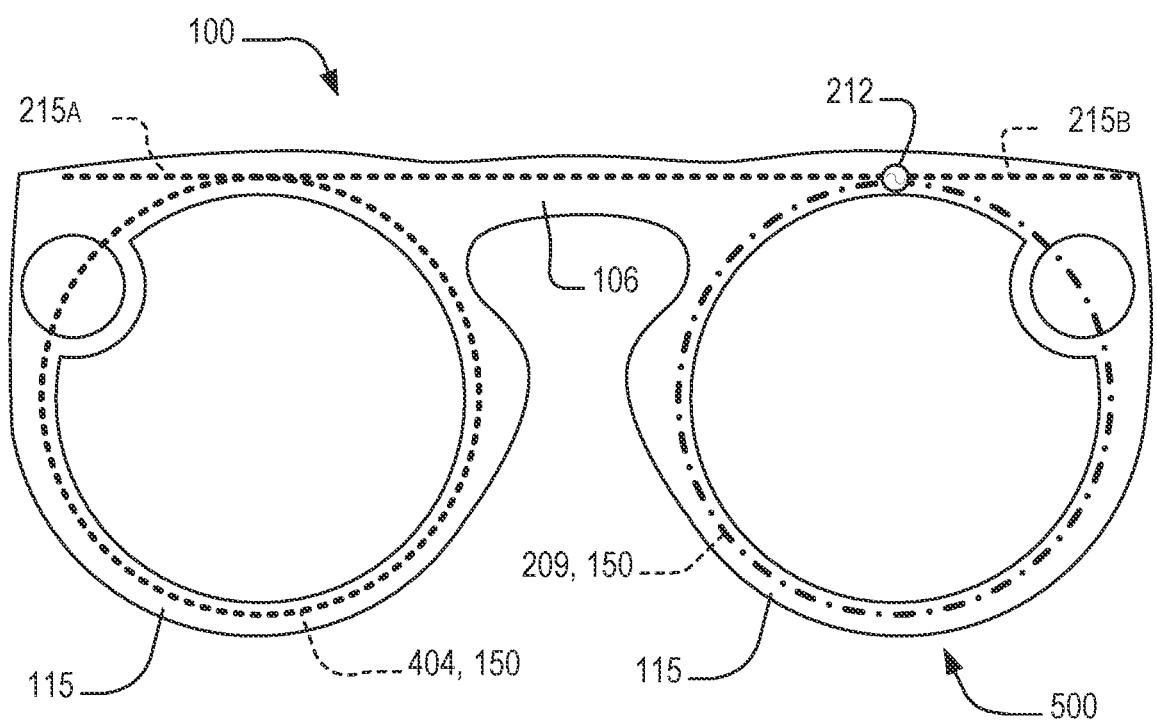
FIG. 5B is a schematic front view of an eyewear device incorporating the antenna system according to the example embodiment of FIG. 5A.

FIG. 5A shows an example embodiment of a hybrid antenna system 500 in which the design of FIG. 4B is modified to meet the goals of industrial design needs for a wearable device by making the hollow fattened portion 404 of the long dipole arm 215a symmetric to the loop antenna 203. FIG. 5B shows an example embodiment in which the hybrid antenna system 500 of FIG. 5A is incorporated into the example eyewear device 100, as described previously. It will be noted that the fattened hollow portion 404 of the long dipole arm 215a is provided by a loop portion defined by a wire conductor extending circumferentially around one of the lens rims 115 of the frame 106 (the other lens rim 115 housing the loop conductor 209). In this example embodiment, the loop portion 404 of the dipole conductor 215 is provided by a respective lens ring 150 that serves as a retaining mechanism for removable and replaceable retention of the associated lens 112. Thus, in the embodiment of FIG. 5B, the eyewear device has two lens rings 150 that form part of the integrated antenna system 500, one providing the loop conductor 209 and the other providing a loop-portion 404 of the dipole conductor 215.

Figure 6A:
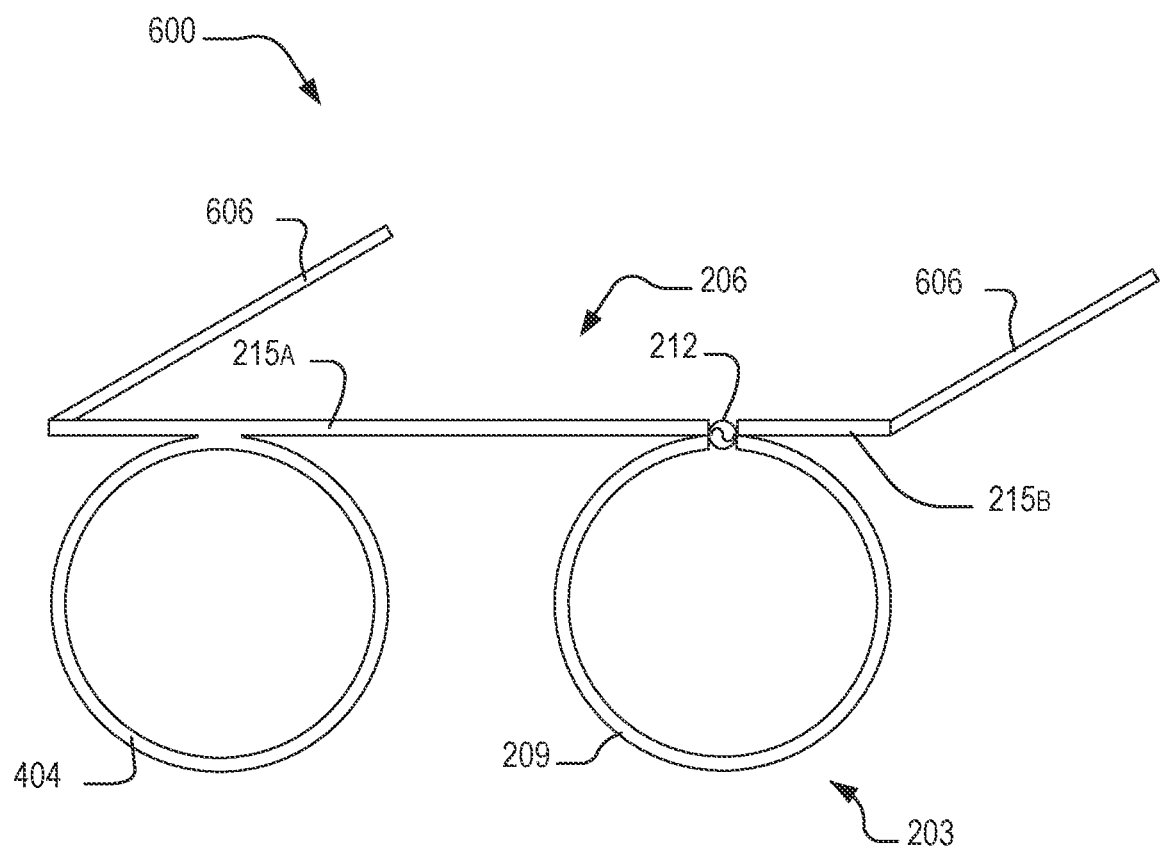
FIG. 6A is a schematic diagram of an antenna system analogous to that of FIG. 5A, respective arms of a dipole conductor forming part of the antenna system having angled end portions extending transversely to a loop conductor, according to an example embodiment.
Figure 6B:
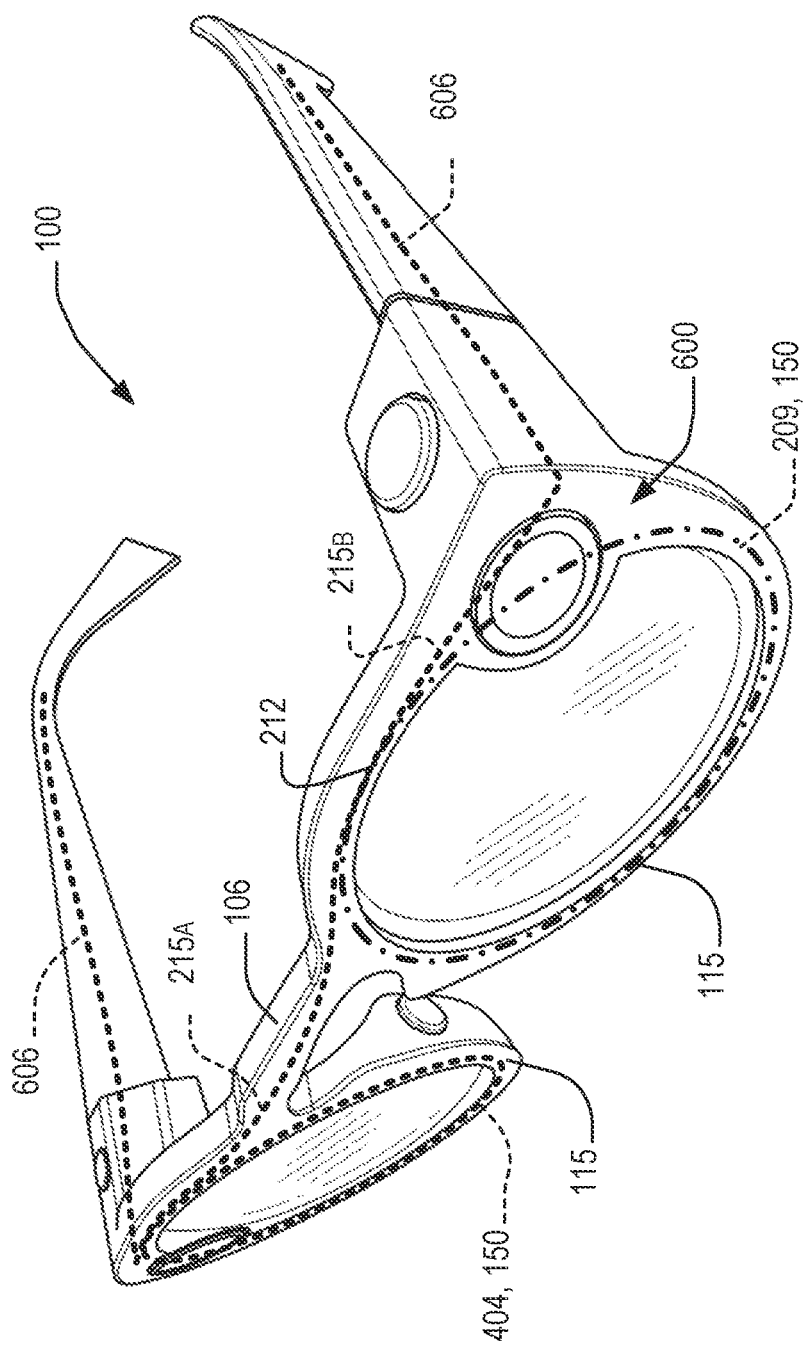
FIG. 6B is a schematic three-dimensional view of an eyewear device incorporating an antenna system according to the example embodiment of FIG. 6A.

FIG. 6A shows a further embodiment of a hybrid antenna system 600 analogous to that of FIG. 5A, but with angled end portions 606 to the arms of the dipole conductor 215 at their ends furthest from the feed point 212. Note that it is possible to bend one or both of the arms 215a, 215b of the dipole 206 such that it is transverse to the plane defined by the loop antenna 203 of FIG. 5, while maintaining functionality. As mentioned, FIGS. 6A and 6B shows a further example embodiment utilizing this insight. The angled end portions 606 of FIG. 6A extend orthogonally relative to the loop conductor 209, being normal to the plane of the loop conductor 209.

FIG. 6B shows an eyewear device 100 as described, having integrated therein an antenna system 600 consistent with FIG. 6A. The device 100 is thus analogous to that of FIG. 5B, except that the arms of the dipole conductor 215a, 215b each has an angled end portion 606 that extends along a respective one of the temples 109 of the eyewear device 100. While beneficially extending the length of the dipole conductor 215, the angled end portions 606 does not put a heavy downward pressure on dipole antenna performance unless the bend degree goes beyond 90 degrees. It will be seen that, in the embodiment of FIG. 6B, the angled end portions 606 of the dipole antenna 206 extend transversely (in this embodiment about orthogonally) relative to a plane defined by the loop conductor 209. It will be seen that the dipole conductor 215 thus has (a) a main portion incorporated in the frame 106 and lying substantially within the plane defined by the loop conductor 209, and (b) the angled end portions 606 extending along the temples 109.

Those portions of the dipole conductor 215 that extends along a respective temples 109 (i.e., the angled end portions 606 in the example of FIG. 6B) may in some embodiments be provided by a wire conductor embedded within the temple 109. In one embodiment, the wire conductor of the temple 109 may be provided by a core wire that provide structural integrity to the temple 109. In other embodiments, the temple conductors 606 may be provided by structural metal component defining the temple 109, or by metal trim components.

In addition, note that the temple portions 606 of the dipole conductor 215 may be configured for disconnection and reconnection with the PCB together with hinged displacement of the corresponding temple 109. In usual fashion, the temples are typically folded flat against the frame when the eyewear device 100 is in a stowed configuration, and are hinged away from the frame into the configuration shown in FIG. 6B when the glasses are to be worn. A coupling may be incorporated in the articulated joint between the frame and the temple such as automatically to connect the temple wire to the PCB when the temple is in the extended position in which it is worn. Such a coupling may be constructed and configured analogously to that described in the disclosure in any of Applicant's U.S. Pat. No. 9,726,904, titled EYEWEAR WITH CONDUCTIVE TEMPLE JOINT (filing date, Sep. 29, 2015); U.S. Pat. No. 9,482,882 titled EYEWEAR HAVING SELECTIVELY EXPOSABLE FEATURE (filed Apr. 15, 2015); and U.S. Pat. No. 9,482,883 titled EYEWEAR HAVING LINKAGE ASSEMBLY BETWEEN A TEMPLE AND A FRAME filed (Apr. 15, 2015), all of which are incorporated herein by reference in their entirety.

It is a benefit of eyewear device of FIG. 6B that it allows for an antenna structure 600 for eyewear electronics in which a prominent aesthetic design material is metal with minimum width gaps and plastic molding. Beyond that, the hybrid dipole-loop structure 600 allows for improved wide band transceiving functional and achieves very efficient radiation.

In this example embodiment, the physical dimensions of the loop conductor 209 and the dipole conductor 215 are selected such that the dipole antenna 206 is configured for better responsiveness to relatively lower-frequency signals, in this case being designed for serving as a GPS receiver antenna. In contrast, the loop antenna 203 is shaped and dimensioned for better performance and relatively higher-frequency, in this example being employed as a Wi-Fi antenna for data communications in a frequency domain of about 2.4 GHz.

Figure 7:
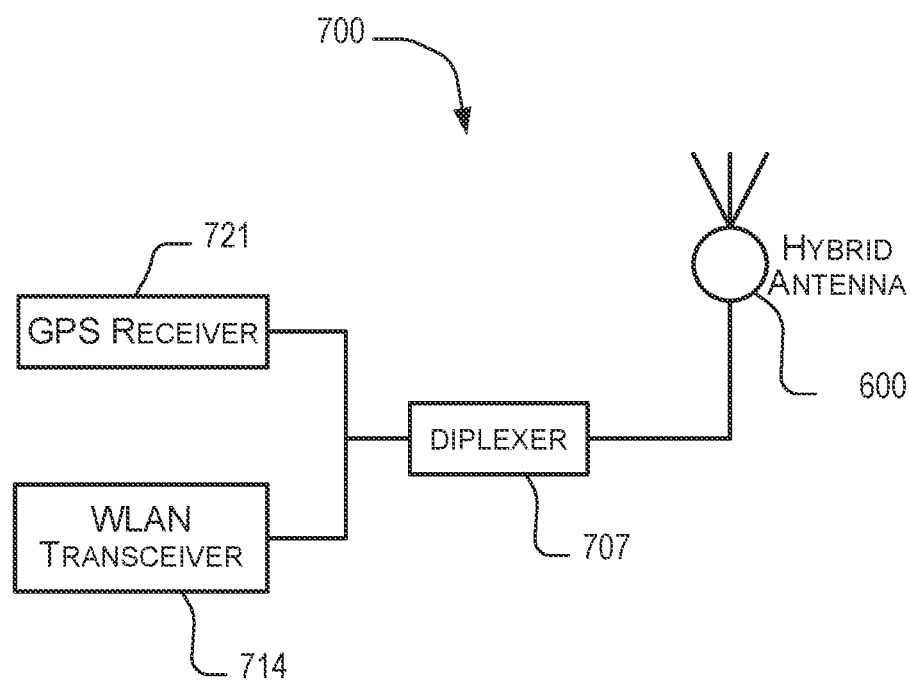
FIG. 7 is a schematic diagram of selected electronic components of an antenna system according to an example embodiment.

FIG. 7 shows a schematic diagram of the hybrid antenna system 700. A transceiver system connected to the hybrid antenna 600 provided by the combination of the loop conductor 209 and the dipole conductor 215 comprises a diplexer 707 that provides frequency-domain multiplexing. The diplexer is connected to a Global Positioning System (GPS) receiver 721 for the reception and interpretation of GPS signals received by the dipole antenna 215, and is connected to a WLAN transceiver 714 for the reception and transmission of higher-frequency data signals via the loop conductor 209.

The following numbered examples is a non-exhaustive list of selected illustrative embodiments in accordance with various aspects of the present disclosure.

Example 1: An antenna system comprising:
a loop conductor;
a non-loop conductor; and
a signal feed mechanism connected in common to the loop conductor and the non-loop conductor to feed/receive electrical signals simultaneously to/from both the loop conductor and the non-loop conductor.

Example 2: The antenna system of example 1, in which the loop conductor the non-loop conductor are shaped and positioned such that a radiation pattern of the loop conductor is substantially orthogonal to a radiation pattern of the non-loop conductor, when both are driven by the signal feed mechanism.

Example 3: The antenna system of example 2, in which the shape and spatial arrangement of the loop conductor and the non-loop conductor are such that the loop conductor and the non-loop conductor radiate with different respective polarizations, when driven by the signal feed mechanism.

Example 4: The antenna system of any one of examples 1-3, wherein the signal feed mechanism is operatively connected for signal transmission with both the loop conductor and the non-loop conductor at a common signal feed point.

Example 5: The antenna system of example 4, in which the non-loop conductor extends tangentially to the loop conductor at the signal feed point.

Example 6: The antenna system of example 4 or example 5, in which the non-loop conductor is a dipole conductor connected to the signal feed mechanism to provide dipole antenna functionality.

Example 7: The antenna system of example 6, in which the dipole conductor is center-fed, with the feed point being located substantially centrally along the length of the dipole conductor.

Example 8: The antenna system of example 6, in which the dipole conductor is offset-fed, the feed point being offset from a center of the length of the dipole conductor.

Example 9: The antenna system of example 8, in which the offset feed point separates a shorter arm of the dipole conductor and a longer arm of the dipole conductor, the longer arm of the dipole conductor having, for at least part of its length, an increased width relative to the shorter arm of the dipole conductor.

Example 10: The antenna system of example 9, in which the increased width of the longer arm is provided by a hollow fattened portion of the longer arm.

Example 11: The antenna system of example 10, in which the hollow fattened portion of the long arm of the dipole conductor is loop-shaped.

Example 12: The antenna system of example 11, wherein the antenna system is incorporated in an electronics-enabled eyewear device, the loop-shaped portion of the dipole conductor comprising a wire conductor extending circumferentially along a lens holder defined by a frame of the eyewear device for holding a lens or other optical element of the eyewear device.

Example 13: The antenna system of example 12, wherein the wire conductor is provided by a lens retainer configured to engage a radially outer periphery of an optical element inserted in the lens holder, thereby to retain the optical element in the lens holder.

Example 14: The antenna system of examples 6-13, in which the dipole conductor comprises:
 a main portion that lies substantially within a plane defined by the loop conductor, the feed point being located in the main portion; and
 for at least one of the ends of the dipole conductor, an angled end portion that extends transversely relative to the plane of the loop conductor.

Example 15: The antenna system of example 14, in which each of the arms of the dipole conductor defines a respective angled end portion.

Example 16: The antenna system of example 14 or example 15, in which the antenna system is incorporated in an eyewear device, the main portion of the dipole conductor extending laterally along a front-facing frame of the eyewear device, each angled end portion extending along a respective temple connected to the frame for supporting the frame on a user's face during wearing of the eyewear device.

Example 17: The antenna system of any one of examples 1-16, further comprising a diplexer to provide frequency-domain multiplexing based on respective frequency domains of the loop conductor and the non-loop conductor.

Example 18: The antenna system of example 17, where in the respective conductors and the diplexer are configured such that the non-loop conductor serves as a lower frequency GPS antenna, and the loop conductor serves as a higher frequency data communication antenna.

Example 19: The antenna system of example 17, wherein the loop conductor is configured to serve as the data communication channel at a frequency of about 2-2.4 GHz.

Example 20: A device comprising:
 a body;
 onboard electronics carried by the body; and
 an antenna system connected to the onboard electronics and housed by the body to provide wireless connectivity to the onboard electronics, the antenna system being configured according to any one of examples 1-19.

Example 21: An eyewear device comprising:
 an eyewear body configured for supporting one or more lenses within view of a user;
 onboard electronics incorporated in the eyewear body; and
 an antenna system housed in the eyewear body and connected to the onboard electronics to provide wireless connectivity to the onboard electronics, the antenna system comprising:
   a loop electrical conductor;
   a non-loop electrical conductor; and
   a transceiver connected in common to the loop electrical conductor and the non-loop electrical conductor to transmit/receive electrical signals simultaneously to/from both the loop electrical conductor and the non-loop electrical conductor.

Example 22: The eyewear device of example 21, wherein the loop electrical conductor extends in a loop circumferentially around one of the lenses held by the eyewear body.

Example 23: The eyewear device of example 21, wherein:
 the eyewear body comprises a frame defining a pair of lens holders, each of which defines a respective lens opening for reception of a corresponding lens therein; and
 wherein the loop electrical conductor is at least partially housed by a corresponding one of the lens holders, extending circumferentially around the corresponding lens opening.

Example 24: The eyewear device of example 22 or example 23, wherein the loop electrical conductor is provided by a lens retainer element configured for engagement with a radially outer periphery a lens held by the eyewear device, thereby to retain the lens in position on the eyewear body Example 25: The eyewear device of any one of examples 22-24, wherein the non-loop electrical conductor comprises a dipole conductor incorporated in the eyewear body to extend along at least a part of the eyewear body.

Example 26: The eyewear device of example 25, wherein the eyewear body comprises a frame that defines a pair of lens holders for supporting the optical elements, the dipole conductor being incorporated in the frame to extend laterally across at least part of the frame, the dipole conductor being substantially tangential relative to the loop electrical conductor that extends circumferentially around one of the optical elements.

Example 27: The eyewear device of example 25, wherein the dipole connector includes a loop portion that extends circumferentially along the lens holder other than the lens holder associated with the loop electrical conductor.

Example 28: The eyewear device of any one of examples 26 or 27, wherein the dipole conductor includes at least one temple portion of that is incorporated in and extends along a temple connected to the frame for supporting the frame during wear, the temple portion, when the eyewear device is in a wearable configuration, extending transversely to a plane defined by the loop electrical conductor.

Example 29: The eyewear device of example 21, wherein the dipole conductor comprises two temple portions at opposite ends of the dipole conductor, each temple portion extending along a corresponding temple forming part of the eyewear body.

Example 30: The eyewear device of example 21, wherein the antenna system has the features of any one of examples 1-19.

Example 31. An antenna system comprising:
 a loop conductor;
 a non-loop conductor; and
 a signal teed mechanism connected in common to the loop conductor and the non-loop conductor to transceive electrical signals simultaneously through both the loop conductor and the non-loop conductor.

Example 32. The antenna system of example 31, in which the loop conductor and the non-loop conductor are shaped and positioned such that a radiation pattern of the loop conductor is substantially orthogonal to a radiation pattern of the non-loop conductor, when both the loop conductor and the non-loop conductor are driven by the signal feed mechanism.

Example 33. The antenna system of example 32, in which the shape and spatial arrangement of the loop conductor and the non-loop conductor are such that the loop conductor and the non-loop conductor radiate with different respective polarizations, when driven by the signal feed mechanism.

Example 34. The antenna system of example 31, wherein the signal feed mechanism is operatively connected for signal transmission with both the loop conductor and the non-loop conductor at a common signal feed point.

Example 35. The antenna system of example 34, in which the non-loop conductor is a dipole conductor connected to the signal feed mechanism to provide dipole antenna functionality, the dipole conductor comprising two linear arms connected at adjacent ends thereof to the signal feed point.

Example 36. The antenna system of example 35, in which the dipole conductor is offset-fed, the feed point being offset from a lengthwise center of the dipole conductor, so that the dipole conductor comprises a shorter arm and a longer arm.

Example 37. The antenna system of example 36, in which the longer arm of the dipole conductor has, for at least part of its length, an increased width relative to the shorter arm of the dipole conductor, the increased width of the longer arm being provided by a loop-shaped portion of the dipole conductor.

Example 38. The antenna system of example 37, wherein the antenna system is incorporated in an electronics-enabled eyewear device, the loop-shaped portion of the dipole conductor comprising a lens retainer extending circumferentially along a lens holder defined by a frame of the eyewear device, the lens retainer being disposable between a locked condition in which it retains a lens in the lens holder, and a released condition in which it permits removal and replacement of the lens.

Example 39. The antenna system of example 35, in which the dipole conductor comprises:
a main portion that lies substantially within a plane defined by the loop conductor, the feed point being located in the main portion; and
for at least one of the ends of the dipole conductor, an angled end portion that extends transversely relative to the plane of the loop conductor.

Example 40. The antenna system of example 31, further comprising a diplexer connected to the non-loop conductor and to the loop conductor to provide frequency-domain multiplexing based on respective frequency domains of the loop conductor and the non-loop conductor.

Example 41. The antenna system of example 40, wherein the respective conductors and the diplexer are configured such that the non-loop conductor serves as a GPS antenna, and the loop conductor serves as a data communication antenna, the frequency domain of the loop conductor being higher than the frequency domain of the non-loop conductor.

Example 42. A device comprising:
a body;
onboard electronics carried by the body; and
an antenna system connected to the onboard electronics and housed by the body to provide wireless connectivity to the onboard electronics, the antenna being configured according to any one of example 1-41 or 43-50.

Example 43. An eyewear device comprising:
an eyewear body configured for supporting one or more lenses within view of a user;
onboard electronics incorporated in the eyewear body; and
an antenna system housed in the eyewear body and connected to the onboard electronics to provide wireless connectivity to the onboard electronics, the antenna system according to any one of examples 31-41

Example 44. The eyewear device of example 43, wherein the loop electrical conductor extends in a loop circumferentially around one of the lenses held by the eyewear body.

Example 45. The eyewear device of example 44, wherein the loop electrical conductor is provided by a lens retainer element configured for engagement with a radially outer periphery of a lens held by the eyewear device, thereby to retain the lens in position on the eyewear body, the lens retainer element being disposable between a locked condition in which it retains a lens on the eyewear body, and a released condition in which it permits removal and replacement of the lens Example 46. The eyewear device of example 44, wherein the non-loop electrical conductor comprises a dipole conductor incorporated in the eyewear body to extend along at least a part of the eyewear body.

Example 47. The eyewear device of example 46, wherein the eyewear body comprises a frame that defines a pair of lens holders for supporting respective lenses, the dipole conductor being incorporated in the frame to extend laterally across at least part of the frame, the dipole conductor being substantially tangential relative to the loop electrical conductor that extends circumferentially around one of the optical elements, wherein the dipole conductor includes a loop portion that extends circumferentially along the lens holder other than the lens holder associated with the loop electrical conductor.

Example 48. The eyewear device of example 46, wherein the dipole conductor includes at least one temple portion of that is incorporated in and extends along a temple connected to the frame for supporting the frame during wear, the temple portion, when the eyewear device is in a wearable configuration, extending transversely to a plane defined by the loop electrical conductor.

Example 49. The eyewear device of example 43, further comprising a diplexer connected to the non-loop conductor and to the loop conductor to provide frequency-domain multiplexing based on respective frequency domains of the loop conductor and the non-loop conductor.

Example 50. The eyewear device of example 43, wherein the respective conductors and the diplexer are configured such that the non-loop conductor serves as a UPS antenna, and the loop conductor serves as a data communication antenna, the frequency domain of the loop conductor being higher than the frequency domain of the non-loop conductor.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An eyewear device comprising:
    a body comprising:
       an eyewear frame configured to hold one or more eyewear lenses, and
       a pair of temples that, in a wearable configuration, project rearwards from the eyewear frame for supporting the eyewear frame within view of a user during wear of the eyewear device;
    onboard electronics incorporated in the eyewear device;
    an antenna system coupled to the onboard electronics for wireless signal transception to and/or from the onboard electronics; and
    a lens retainer comprising an electrically conductive element extending circumferentially along an associated one of the one or more eyewear lenses, the lens retainer being selectively disposable between:
       a locked condition in which the lens retainer is engaged with the associated eyewear lens to resist removal thereof from the eyewear frame, and
       a released condition in which removal and replacement of the associated eyewear lens is permitted,
    wherein the lens retainer is conductively coupled to the onboard electronics to provide a driven antenna element forming part of the antenna system.

2. The eyewear device of claim 1, wherein the lens retainer comprises a lens ring which is, in the locked condition engaged with a radially outer edge face of the associated eyewear lens.

3. The eyewear device of claim 1, wherein the driven antenna element provided by said lens retainer forms at least part of a loop conductor incorporated in the antenna system.

4. The eyewear device of claim 1, wherein the driven antenna element provided by said lens retainer forms at least part of a non-loop conductor incorporated in the antenna system.

5. The eyewear device of claim 4, wherein said non-loop conductor is a dipole conductor, said lens retainer forming part of one of a pair of arms of the dipole conductor.

6. The eyewear device of claim 1, wherein the eyewear frame has a pair of eyewear lenses and a corresponding pair of lens retainers, each of the pair of lens retainers comprising a respective electrically conductive element extending circumferentially along the associated eyewear lens.

7. The eyewear device of claim 6, wherein the antenna system comprises:
    a loop conductor;
    a non-loop conductor; and
    a signal feed mechanism connected in common to the loop conductor and the non-loop conductor to transceive wireless electrical signals simultaneously to and/or from both the loop conductor and the non-loop conductor,
    wherein said lens retainer provides at least part of the loop conductor or the non-loop conductor.

8. The eyewear device of claim 7, wherein said lens retainer is one of a pair of lens retainers extending around respective eyewear lenses, one of the pair of lens retainers providing the loop conductor and the other one of the pair of lens retainers providing a loop-shaped portion of the non-loop conductor.

9. The eyewear device of claim 7, wherein the loop conductor and the non-loop conductor are shaped and positioned such that a radiation pattern of the loop conductor is substantially orthogonal to a radiation pattern of the non-loop conductor, when both are driven by the signal feed mechanism.

10. The eyewear device of claim 9, wherein the loop conductor and the non-loop conductor are shaped and have a relative spatial relationship such that the loop conductor and the non-loop conductor radiate with different respective polarizations, when driven by the signal feed mechanism.

11. The eyewear device of claim 10, in which the non-loop conductor is a dipole conductor connected to the signal feed mechanism at a signal feed point.

12. The eyewear device of claim 11, in which the dipole conductor is center-fed, with the signal feed point being located substantially centrally along the length of the dipole conductor.

13. The eyewear device of claim 11, in which the dipole conductor is offset-fed, the signal feed point being offset from a center of the length of the dipole conductor.

14. The eyewear device of claim 13, in which the offset signal feed point separates a shorter dipole arm and a longer dipole arm that together form the dipole conductor, the longer dipole arm having, for at least part of its length, an increased width relative to the shorter dipole arm.

15. The eyewear device of claim 14, in which that portion of the longer dipole arm that has said increased width is provided by a loop-shaped portion of the longer dipole arm, the loop-shaped portion comprising a wire conductor that provides said lens retainer.

16. The eyewear device of claim 15, in which the dipole conductor comprises:
- a main portion that extends substantially parallel to a plane defined by the loop conductor; and
- to at least one lateral side of the signal feed point, an angled end portion that, when the eyewear device is in the wearable configuration, projects transversely relative to the main portion.

17. The eyewear device of claim 16, in which each of the arms of the dipole conductor defines a respective angled end portion.

18. The eyewear device of claim 17, in which the main portion of the dipole conductor extends from side-to-side, relative to an operative viewing direction, along the eyewear frame, each angled end portion extending along a respective one of the pair of temples.

19. The eyewear device of claim 18, wherein each of the angled end portions of the dipole conductor is provided by a respective core wire that additionally provides structural integrity to the corresponding temple.

\* \* \* \* \*